2,749,338
ISOALLOSPIROSTANES

Ralph F. Hirschmann, Westfield, and Norman L. Wendler, Summit, N. J., assignors to Merck & Co., Inc., Rahway, N. J., a corporation of New Jersey No Drawing. Application January 22, 1953, Serial No. 332,764

16 Claims. (Cl. 260—239.55)

This invention relates to novel steroid compounds and processes of obtaining the same. More particularly, it is concerned with a method of preparing $\Delta^{7,9(11)}$-allosapogenins from $\Delta^{9(11)}$-allosapogenins, and novel intermediate products obtained in said process.

The discovery of the remarkable therapeutic properties of cortisone has stimulated great interest in finding alternative methods for the production of cortisone. At present the primary source of raw materials utilized in producing cortisone is the bile acids obtained from animals. However, the supply of bile acids is limited and therefore efforts have been made to find methods by which cortisone and its related compounds can be prepared from other raw materials. The steroids known as sapogenins which can be obtained from various plants are potentially valuable as starting materials for the preparation of cortisone and related compounds. In one method of preparing cortisone from sapogenins described in the art, $\Delta^{7,9(11)}$-3-hydroxy-22-isoallospirostadiene and its 3-acyloxy derivatives are important intermediates. Previously such dienes had been produced by dehydrogenation of $\Delta^7$-allosapogenins obtained from sapogenins such as diosgenin.

It is an object of our invention to provide an improved method of producing $\Delta^{7,9(11)}$-3-hydroxy-22-isoallospirostadiene and its acyl derivatives.

It is a further object to provide novel intermediates and valuable processes useful in the synthesis of cortisone and related compounds from sapogenins.

Other objects will be apparent from the detailed description hereinafter provided.

In accordance with an embodiment of our invention, we have found that $\Delta^{9(11)}$-allosapogenins can be converted into the desired 7:8, 9:11 dienes by the following series of reactions:

In this process the starting material, $\Delta^{9(11)}$-3-hydroxy-22-isoallospirostene or an ester thereof (I) is first converted to the corresponding 9,11-dihydroxy derivative (II) by reaction with osmium tetroxide and subsequent decomposition of the resulting osmate ester. The 3,9,11-trihydroxy-22-isoallospirostane or the corresponding 3-acyloxy derivative thereof (II) is then dehydrated by reaction with thionyl chloride to produce the desired $\Delta^{7,9(11)}$-22-isoallospirostadiene Compound IV. Alternatively, the diene compound can also be obtained by subjecting the 3,11-diacyloxy-9-hydroxy-22-isoallospirostane (III) obtained by the acylation of II to the action of thionyl halide.

The starting compound $\Delta^{9(11)}$-3-hydroxy-22-isoallospirostene and its esters, employed in the present invention can be prepared as described in J. Org. Chem. 16, 1278 (1951). As pointed out above, either the 3-hydroxy compound or a 3-acyloxy compound can be utilized as a starting material in practicing the process of our invention. Generally, however, we find that maximum yields of the desired 9,11-dihydroxy compound are obtained when a 3-acyloxy derivative is employed. The lower aliphatic acid esters such as the acetate, propionate, butyrate, and the like are particularly suitable as starting materials, although other esters, for example the benzoate ester, are also suitable.

The preparation of 3,9,11-trihydroxy-22-isoallospirostane or the 3-acyloxy derivative thereof is effected by intimately contacting the corresponding $\Delta^{9(11)}$-sapogenin with osmium textroxide and decomposing the resulting osmate ester. The osmylation is conveniently carried out by reacting the $\Delta^{9(11)}$-sapogenin in an aromatic hydrocarbon solvent for the reactants in the presence of tertiary amine. Aromatic hydrocarbons such as benzene, toluene, xylene and the like, and tertiary amines such as pyridine, collidine, and the like, are suitable for use in effecting this osmylation. Generally, we prefer to use a benzene-pyridine mixture, since under optimum conditions maximum yields of the desired 9,11-dihydroxy- compound are obtained. Thus, the osmylation of $\Delta^{9,11}$-3-acetoxy-22-isoallospirostene is readily effected by reacting this compound with osmium tetroxide in a benzene-pyridine mixture for sufficient time to complete the formation of the osmate ester. For maximum yields the

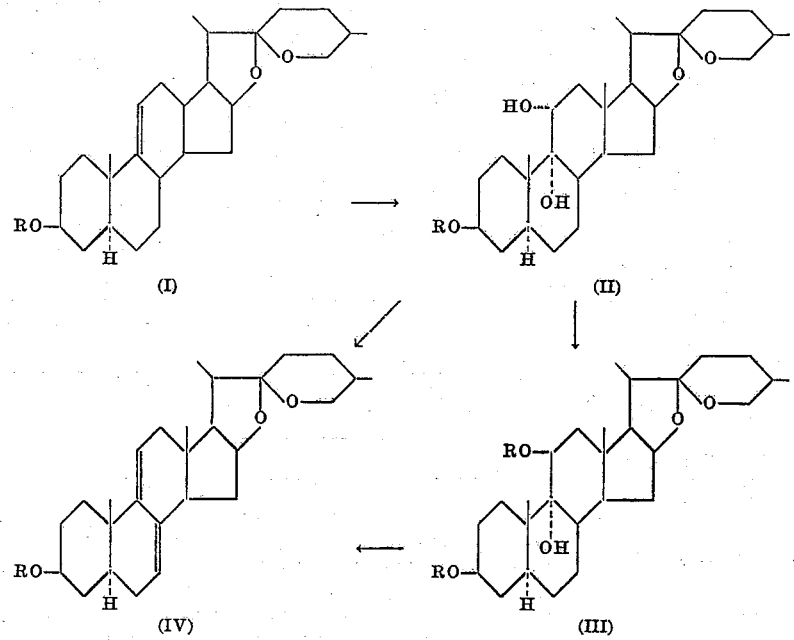

wherein R represents an acyl radical.

reaction mixture is allowed to stand at room temperature for about 3–4 days. However, it would appear that much shorter reaction times might be employed, since the reaction mixture becomes very dark in from about one to two hours, this darkening indicating the formation of the intermediate osmate ester.

When the formation of the osmate ester is complete, it is decomposed by reaction with a reducing agent such as aqueous alcoholic sodium sulfite, manintol-alkali and the like. The resulting 9,11-dihydroxy compound can be isolated from the resulting reaction mixture by extraction with a suitable solvent for the product such as chloroform. If desired, the product obtained by evaporation of the solvent can be further purified by chromatography over alumina in accordance with methods known in the art.

The preparation of the 3,11-diacyloxy-9-hydroxy Compound III is effected by treating Compound II with an acid anhydride in the presence of a tertiary amine such as collidine or pyridine. Thus, the reaction can be carried out with a lower aliphatic acid anhydride to obtain the corresponding acyloxy derivative. For example, when 3 - acetoxy-9,11-dihydroxy-22-isoallospirostane is reacted with acetic anhydride in the presence of pyridine at room temperature for about 12 hours, 3,11-diacetoxy-9-hydroxy-22-isoallospirostane is produced.

In accordance with a further embodiment of our invention, the 9,11-glycol (II) or the 11-acyloxy derivative thereof (III) can be converted to the corresponding $\Delta^{7,9(11)}$-diene (IV) by reaction with a thionyl halide in the presence of a tertiary amine under substantially anhydrous conditions. In effecting this conversion of Compounds II and III to the corresponding diene compound, we prefer to use either thionyl chloride or thionyl bromide in the presence of pyridine.

It is believed that the conversion of Compounds II or III to Compound IV proceeds through the formation of intermediate VI having the structure:

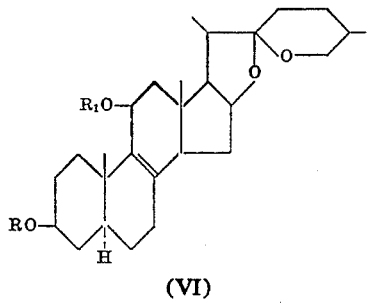

(VI)

wherein R represents an acyl radical and R$_1$O represent hydrogen or an acyl radical.

The reaction with the thionyl halide is preferably carried out at temperatures ranging from 0° to about 30° C. for about eight to fifteen hours. When temperatures of about 20 to 30° C. are employed, the diene is readily isolated in satisfactory yield directly from the reaction mixture. Alternatively when the reaction is effected at temperatures lower than about 20° C. we find that it is desirable to add an alumina chromatography step to the work-up procedure in order to obtain maximum yield of the desired diene. It is believed that at lower temperatures the formation of the diene from the unstable intermediate VI is not complete, and that the alumina treatment is necessary to completely the conversion in satisfactory yield.

The following examples are presented to illustrate methods of carrying out the processes of our invention.

EXAMPLE 1

3β-acetoxy-9α,11α-dihydroxy-22-isoallospirostane

A solution of 0.86 g. of $\Delta^{9(11)}$-3-acetoxy-22-isoallospirostene and 0.54 g. of osmium tetroxide in 0.65 cc. of pyridine and 11 cc. of benzene was allowed to stand at room temperature for ninety-two hours. The dark solution of the osmate ester was then decomposed by addition of 37 cc. of water, 11 cc. of benzene, 25 cc. of methanol and 3.84 g. each of sodium sulfite and potassium bicarbonate. The mixture was stirred at room temperature for five hours, 80 cc. of chloroform added and the suspension filtered. The solid residue from the filtration was washed with about 120 cc. of hot chloroform and the combined chloroform extracts in turn were washed with saturated salt solution and dried over anhydrous sodium sulfate. The residue obtained upon removal of the chloroform was dissolved in benzene-petroleum ether and chromatographed on acid washed alumina. Recrystallization of the ethyl acetate fraction from acetone-petroleum ether yielded 3β-acetoxy-9α,11α-dihydroxy-22-isoallospirostane, M. P. 224–229° C. Recrystallization and chromatography of this material from methanol-water gave essentially pure product, M. P. 224–227° C., $[\alpha]_D^{23}$—68.4 (CHCl$_3$).

Anal.—Calc'd for C$_{29}$H$_{46}$O$_6$: C, 70.98; H, 9.45. Found: C, 70.80; H, 9.45.

EXAMPLE 2

3β,11α-diacetoxy-9α-hydroxy-22-isoallospirostane

A solution of 0.74 g. of 3β-acetoxy-9α,11α-dihydroxy-22-isoallospirostane in 12 cc. of anhydrous pyridine was treated with 6 cc. of acetic anhydride and allowed to stand at room temperature for twelve hours. The mixture was concentrated to dryness in vacuo. The residue was extracted with ether, the ethereal solution washed with dilute hydrochloric acid, with water, and with a saturated salt solution, dried over anhydrous sodium sulfate and concentrated. Crystallization from methanol of the crude product thus obtained yielded 3β,11α-diacetoxy-9α-hydroxy-22-isoallospirostane, M. P. 179–180.5° C. A second recrystallization from methanol raised the melting point to 181° C.

Anal.—Calc'd for C$_{31}$H$_{48}$O$_7$: C, 69.89; H, 9.08. Found: C, 69.71; H, 8.81.

EXAMPLE 3

$\Delta^{7,9(11)}$-3β-acetoxy-22-isoallospirostadiene 262 mg. of 3β,11α-diacetoxy-9α-hydroxy-22-isoallospirostane was dissolved in 1.9 cc. of anhydrous pyridine, chilled to 0° C., and treated with 0.2 cc. of redistilled thionyl chloride. The reaction mixture was allowed to stand at 0–5° C. for sixteen hours. At the end of this period the reaction mixture was allowed to come to room temperature, ether was added, and the mixture rechilled and treated with ice water. The decomposed reaction mixture was extracted with ether and the ether solution of the product washed successively with dilute hydrochloric acid, 5% aqueous sodium bicarbonate and water. Evaporation of the dried ether solution gave an amorphous solid which gave a strong test for unsaturation (yellow color) with tetranitromethane and showed only very weak absorption in the U. V. at 2430 A. and 2500 A. This material was dissolved in petroleum ether-benzene (7:1) and passed through a short column of alumina to give, after recrystallization from ethyl acetate, $\Delta^{7,9(11)}$-3β-acetoxy-22-isoallospirostadiene, M. P. 205–213.5° C., λ max. 2350 A. log ε 4.14, λ max. 2420 A. log ε 4.19, and λ max. 2500 A. log ε 4.0.

Anal.—Calc'd for C$_{29}$H$_{42}$O$_4$: C, 76.61; H, 9.31. Found: C, 77.00; H, 9.40.

EXAMPLE 4

$\Delta^{7,9(11)}$-3β-acetoxy-22-isoallospirostadiene 70 mg. of 3β,11α-diacetoxy-9α-hydroxy-22-isoallospirostane was dissolved in 0.5 cc. of anhydrous pyridine and 0.05 cc. of freshly distilled thionyl chloride. The solution became yellow in a very short time. The reaction mixture was allowed to stand overnight at room temperature. It was then poured into ice-water and the aqueous mixture held at room temperature for about three hours. The precipitate which had formed was filtered, washed with water and dissolved in ether. The ethereal extract was washed in turn with dilute hydrochloric acid, dilute sodium bicarbonate solution, water and saline solution. Removal of the ether gave an amorphous residue. By recrystallization of this residue from methanol there was obtained $\Delta^{7,9(11)}$-3$\beta$-acetoxy-22-isoallospirostadiene, M. P. 184–207° C. The melting point could be raised to 205–212° C. by further recrystallization from the same solvent.

The acyl derivatives of 3,9,11-trihydroxy-22-isoallospirostane such as 3-acetoxy-9,11-dihydroxy-22-isolallospirostane and 3,11-diacetoxy-9-hydroxy-22-isoallospirostane shown in the foregoing examples can be readily hydrolyzed in accordance with methods known in the art to obtain 3,9,11-trihydroxy-22-isoallospirostane.

Various changes and modifications may be made in carrying out the present invention without departing from the spirit and scope thereof. Insofar as these changes and modifications are within the purview of the annexed claims, they are to be considered as part of our invention.

We claim:

1. The process which comprises reacting a compound from the group consisting of $\Delta^{9(11)}$-3-hydroxy-22-isoallospirostene and lower aliphatic acid esters thereof with osmium tetroxide, and decomposing the resulting osmate ester by reaction with a reducing agent to produce the corresponding 9,11-glycol.

2. The process which comprises reacting a lower aliphatic acid ester of $\Delta^{9(11)}$-3-hydroxy-22-isoallospirostene with osmium tetroxide in an aromatic hydrocarbon solvent in the presence of a tertiary amine, and decomposing the resulting osmate ester by reaction with a reducing agent to produce the corresponding 9,11-glycol.

3. The process which comprises intimately contacting $\Delta^{9(11)}$-3-acetoxy-22-isoallospirostene with osmium tetroxide in an aromatic hydrocarbon solvent in the presence of pyridine, and decomposing the resulting osmate ester by reaction with sodium sulfite to produce 3-acetoxy-9,11-dihydroxy-22-isoallospirostane.

4. 3,9,11 - trihydroxy - 22 - isoallospirostane having the structural formula

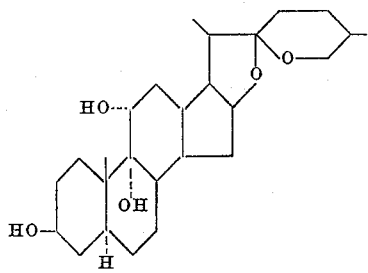

5. 3-acetoxy-9,11-dihydroxy-22-isoallospirostane having the structural formula

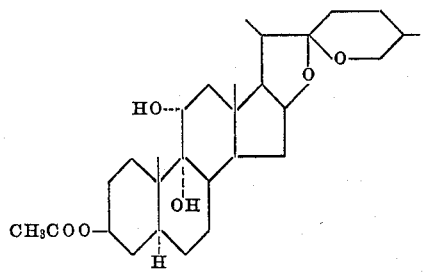

6. The process which comprises reacting 3-acetoxy-9,11-dihydroxy-22-isoallospirostane with acetic anhydride in the presence of a tertiary amine to produce 3,11-diacetoxy-9-hydroxy-22-isoallospirostane.

7. 3,11-diacetoxy-9-hydroxy-22-isoallospirostane having the structural formula

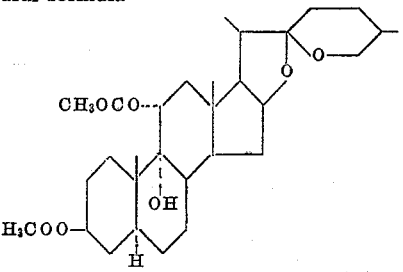

8. The process which comprises intimately contacting a compound from the group consisting of 3-lower aliphatic acid esters of 3-hydroxy-9,11-dihydroxy-22-isoallospirostane and 3,11-di-lower aliphatic acid esters of 3,9,11-trihydroxy-22-isoallospirostane with a thionyl halide in the presence of a tertiary amine to produce a lower aliphatic acid ester of $\Delta^{7,9(11)}$-3-hydroxy-22-isoallospirostadiene.

9. The process which comprises reacting 3-acetoxy-9,11-dihydroxy-22-isoallospirostane with thionyl chloride in the presence of pyridine to produce $\Delta^{7,9(11)}$-3-acetoxy-22-isoallospirostadiene.

10. The process which comprises reacting a lower aliphatic acid ester of $\Delta^{9(11)}$-3-hydroxy-22-isoallospirostene with osmium textroxide in the presence of a tertiary amine, decomposing the resulting osmate ester by reaction with a reducing agent to produce the corresponding 9,11-glycol, and reacting said glycol with a thionyl halide in the presence of a tertiary amine to produce the corresponding lower aliphatic acid ester of $\Delta^{7,9(11)}$-3-hydroxy-22-isoallospirostadiene.

11. The process which comprises reacting $\Delta^{9(11)}$-3-acetoxy-22-isoallospirostene with osmium tetroxide in the presence of pyridine, decomposing the resulting osmate ester by reaction with sodium sulfite to produce 3-acetoxy-9,11-dihydroxy-22-isoallospirostane, and reacting said compound with thionyl chloride in the presence of pyridine to produce $\Delta^{7,9(11)}$-3-acetoxy-22-isoallospirotadiene.

12. The process which comprises intimately contacting a lower aliphatic acid ester of $\Delta^{9(11)}$-3-hydroxy-22-isoallospirostene with osmium tetroxide in the presence of a tertiary amine, decomposing the resulting osmate ester by reaction with a reducing agent to produce the corresponding 9,11-glycol, reacting said glycol with a lower aliphatic acid anhydride in the presence of a tertiary amine to produce the corresponding 3,11-diacyloxy-9-hydroxy-22-isoallospirostane, and treating said isoallospirostane with a thionyl halide in the presence of a tertiary amine to produce the corresponding lower aliphatic ester of $\Delta^{7,9(11)}$-3-hydroxy-22-isoallospirostadiene.

13. The process which comprises intimately contacting $\Delta^{9(11)}$-3-acetoxy-22-isoallospirostene with osmium tetroxide in the presence of pyridine, decomposing the resulting osmate ester by reaction with sodium sulfite to produce 3-acetoxy-9,11-dihydroxy - 22 - isoallospirostane, reacting said isoallospirostane with acetic anhydride in the presence of pyridine to produce 3,11-diacetoxy-9-hydroxy-22-isoallospirostane, and treating said isoallospirostane with thionyl chloride in the presence of pyridine to produce $\Delta^{7,9(11)}$-3-acetoxy-22-isoallospirostadiene.

14. A 3-acyloxy-9,11-dihydroxy - 22 - isoallospirostane having the structural formula

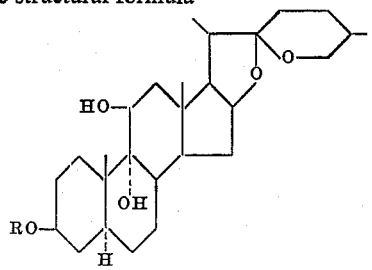

wherein R represents a lower aliphatic acid radical.

15. The process which comprises reacting a 3-acyloxy-9,11-dihydroxy-22-isoallospirostane having the structural formula

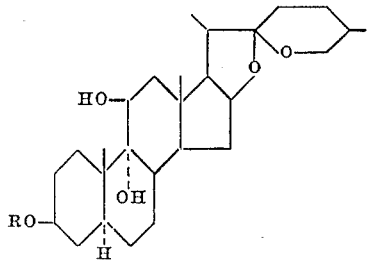

wherein R represents a lower aliphatic acid radical, with a lower aliphatic acid anhydride to produce a compound having the structural formula

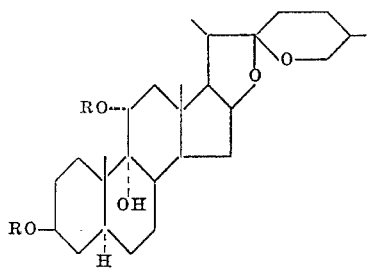

wherein R is a lower aliphatic acid radical.

16. A 3,11-diacyloxy-9-hydroxy - 22 - isoallospirostane having the structural formula

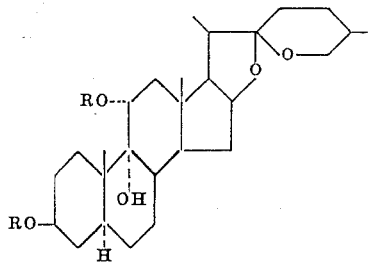

wherein R is a lower aliphatic acid radical.

References Cited in the file of this patent

FOREIGN PATENTS 561,566   Great Britain ------------------ 1944

OTHER REFERENCES

Djerassi, J. of Org. Chem., vol. 16, 1951, pp. 1278–82.